Dec. 7, 1937.  G. POTSTADA  2,101,595
CORRUGATED SLICER AND DETACHABLE SHREDDING SET
Filed Oct. 29, 1934
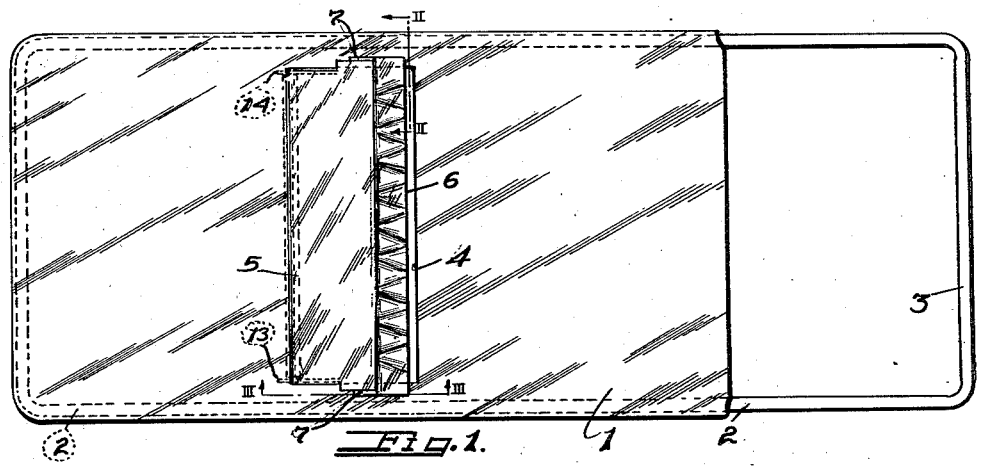
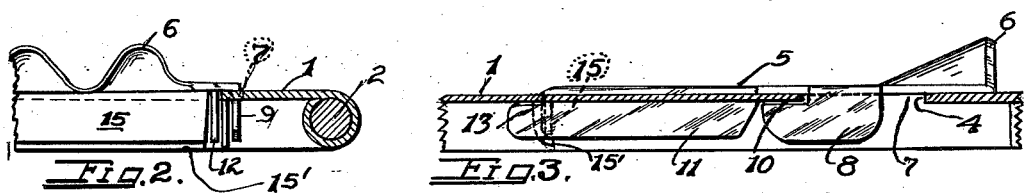
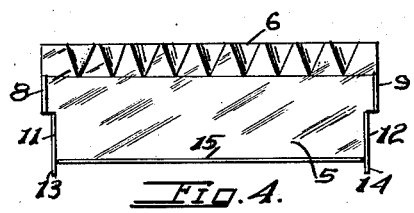
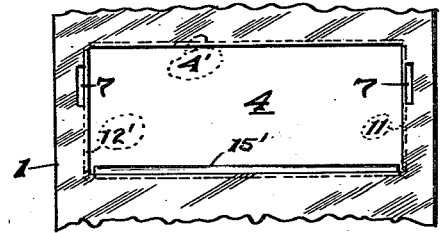
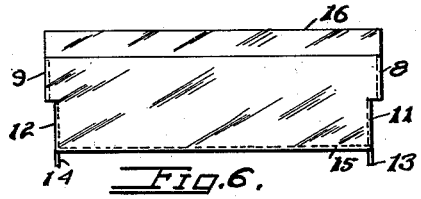
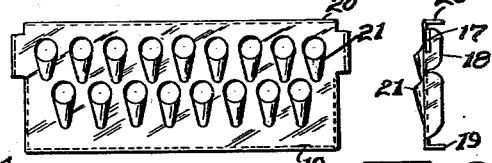
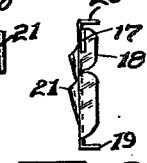
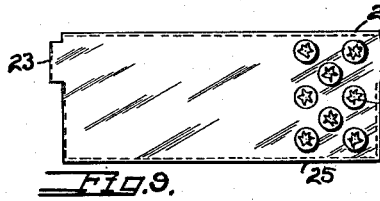
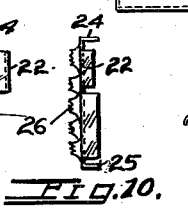
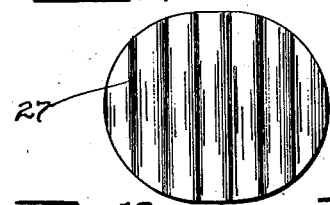
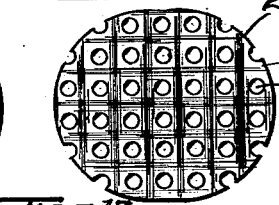
INVENTOR.
George Potstada
BY
John H. Morgan
ATTORNEY.

Patented Dec. 7, 1937

2,101,595

UNITED STATES PATENT OFFICE 2,101,595

CORRUGATED SLICER AND DETACHABLE SHREDDING SET

George Potstada, Oakland, Calif.

Application October 29, 1934, Serial No. 750,449

6 Claims. (Cl. 146—171)

This invention relates to improvements in corrugated slicer and detachable shredding sets and more particularly to a device for slicing vegetables in corrugated slices and a holder that holds detachable shredding and grating knives, and one of the objects of the invention is to provide a slicing knife having a corrugated cutting edge and means to hold the knife blade so that thin corrugated slices may be made from a vegetable, specially to slice potatoes for making potato chips.

Another object is to provide a blade of this kind so that if the vegetable is moved over the blade in one way a corrugated slice will be made, and then if the vegetable is turned at an angle to the first movement, cross corrugations are made, and if the slices are very thin, holes will be cut through in the made corrugations, thus making an ornamental slice of vegetables or fruit.

Another object of the invention is to provide a grater holder having means to attach and detach different slicing and shredding blades, and to provide interlocking means for holding the blades in place.

Another object is to provide a holder for a corrugated slicer which is adapted to slide in the "combination vegetable grater" shown in my application filed May 24, 1933, Serial No. 672,582.

Another object is to provide a holder with corrugated cutting edge formed in the holder face.

Another object is to provide a holder of this kind that may be used in connection with a stand that holds the vegetable stationary and which allows the grater holder to slide, or one that can be used independently wherein the vegetable is moved.

Other objects of the invention will appear to those skilled in the art to which it appertains as the description progresses. An embodiment of the invention is shown in the accompanying drawing in which the same reference numeral is applied to the same portion throughout the several views, and of which there may be modifications.

Figure 1 is a face view of a holder showing a detachable corrugated edge slicer attached.

Figure 2 is an enlarged sectional view taken on line 2—2 of Figure 1.

Figure 3 is an enlarged sectional view taken on line 3—3 of Figure 1.

Figure 4 is a bottom view of the corrugated edge blade shown in the attached position in Figure 1.

Figure 5 is a plan of a portion of a holder showing the opening for the slicer-blade.

Figure 6 is a view of a straight edge slicing blade.

Figure 7 shows a grater blade adapted to fill the opening in the holder.

Figure 8 is a side view of the view shown in Figure 7.

Figure 9 shows another type of grater.

Figure 10 is a side view of Figure 9.

Figure 11 is an edge view of a corrugated vegetable slice.

Figure 12 shows a corrugated vegetable slice.

Figure 13 is a view similar to Figure 12 but shows the effect of corrugations at right angles to the first made corrugations.

The numeral 1 indicates a sheet metal frame holder reinforced by the wire 2 in the well known way, and having the wire extend to form a handle 3. An opening 4 is provided in the sheet metal into which fits the blade 5 which may be provided with a corrugated slicing edge 6 as shown, or other forms of slicing and shredding edge and surface.

On each side of the opening 4 there is a slot 7 adapted to receive the hook like members 8 and 9; these members are formed by cutting the slots 10 and bending down the member on the edge of the blade.

The members 11 and 12 are inset and bent down and the ends 13 and 14 extending to form the interlocking means by sliding under the edge of the opening as shown.

The edge 15 is bent down to strengthen the blade.

The blade shown in Figure 6 is made in the same way but has a straight slicing blade 16. The form shown in Figures 7 and 8 has the slot 17 in the hook member 18 the reverse way from slot 10, and has both sides 19 and 20 bent down; the shredder surface may be in any form as 21.

In the form shown in Figures 9 and 10 the bent down members 22 and 23 fit the slots 7, and the members 24 and 25 fit the opening 4.

The shredding surface may take any form, in this instance the raised cutters 26 are shown.

Figures 11, 12, and 13 show the form of sliced vegetables made with the corrugated edge blade 27 showing straight corrugations and 28 showing cross corrugations, in this instance at right angles, but may be on any angle. the holes 29 being formed in thin slices by the cross cutting.

In operation the holder may be placed in the guides of a grater stand and reciprocated on the vegetable placed in the trough and held or given a quarter turn or less to produce the ornamental effects desirable in making potato chips, or the vegetable may be moved to and fro on the holder slicing or shredding blades.

A set of detachable blades should be supplied for each holder.

Having thus described my invention what I wish to secure by Letters Patent of the United States is as follows, but modifications may be had in carrying out the invention as shown in the accompanying drawing and in the particularly described form thereof within the purview of the annexed claims.

I claim:

1. A device of the class described comprising a holder, an opening in said holder, a detachable blade having a cutting edge for said opening, a slot on each side of said opening, hook-like members on each side of said blade adjacent said cutting edge adapted to engage said slots, projecting members on said blade at the opposite end thereof whereby when said blade is inserted in the opening and pushed back, said blade will be locked in place.

2. A device of the class described comprising a holder, an opening in the face of said holder, a slot on each side of said opening, a cutting blade adapted to be mounted across said opening, said blade having bent down members at the sides thereof adapted to engage said slots, slots in said bent down members opening rearwardly and receiving the rear edge of the first mentioned slots when said blade is inserted and moved back, and projecting members on the blade at the rear end thereof adapted to engage the under side of the rear edge of said opening.

3. A device of the class described comprising a holder having a wire frame and handle, and a sheet metal face, in combination with an opening in said face having its edges bent downwardly, slots on opposite sides of said opening, a slicing and shredding blade to fit into said opening, said blade having hook like members on each side to engage said slots when moved backward, rearwardly projecting members on said blades adapted to slide under the rear side of said opening when moved backward whereby the blade is interlocked in position.

4. A device of the class described comprising a sheet metal holder, an opening having forward, rear and side edges in said holder, slots adjacent the side edges of said opening, a detachable blade having a rear edge, a forward cutting edge and side edges to be inserted into said opening, bent down hook like members on the side edges of said blade adapted to hook under the rear edges of said slots, when said blade is inserted in the opening, and moved backward, and rearwardly projecting members on the rear portion of the blade adapted to engage the under side of the rear edge of said opening as the blade in moved rearwardly.

5. A device of the class described comprising a holder, an opening in the face of said holder, a slot on each side of said opening, a detachable slicing blade having a forwardly projecting cutting edge adapted to fit into said opening, bent down portions on said blade having slots opening rearwardly and adapted to hook into said first slots and to engage the edges of said first slots when the blade is moved backward and rearwardly projecting members on said blade adapted to slide under the back edge of said opening.

6. A device of the class described comprising a holder, an opening in said holder, a detachable blade having a cutting edge, a slot in the holder adjacent each side of said opening, and integral hook-like members on each side of said blade extending laterally thereof in the same direction and facing in the same direction adapted to engage said slots whereby when said blade is inserted in the opening and moved laterally, said blade will be locked in place.

GEORGE POTSTADA.